United States Patent [19]

Barlow

[11] Patent Number: 4,585,709
[45] Date of Patent: Apr. 29, 1986

[54] METHOD AND APPARATUS FOR REGULATING THE HYDRATE FORMATION TEMPERATURE IN A METAL-HALOGEN BATTERY

[75] Inventor: Dane D. Barlow, Bloomfield Hills, Mich.

[73] Assignee: Energy Development Associates, Inc., Greensboro, N.C.

[21] Appl. No.: 459,713

[22] Filed: Jan. 21, 1983

[51] Int. Cl.$^4$ .................................................. H01M 8/04
[52] U.S. Cl. ........................................ 429/19; 429/26; 429/50; 429/72; 429/101; 429/120
[58] Field of Search ............... 429/17, 15, 19, 24, 429/26, 51, 64, 70, 72, 90, 120, 62, 101, 105, 20, 50; 62/185, 201; 165/32, 35; 364/500

[56] References Cited

U.S. PATENT DOCUMENTS

| | | | |
|---|---|---|---|
| 3,713,888 | 1/1973 | Symons | 429/51 |
| 3,783,027 | 1/1974 | Bjorkman | 423/241 |
| 3,809,578 | 5/1974 | Symons | 429/51 |
| 3,814,630 | 6/1974 | Bjorkman, Jr. | 429/70 |
| 3,823,036 | 7/1974 | Bjorkman, Jr. | 429/70 |
| 3,907,592 | 9/1975 | Symons | 320/2 |
| 3,908,001 | 9/1975 | Symons et al. | 423/472 |
| 3,935,024 | 1/1976 | Symons | 429/15 |
| 3,940,283 | 2/1976 | Symons | 429/81 |
| 3,993,502 | 11/1976 | Bjorkman, Jr. | 429/51 |
| 4,020,238 | 4/1977 | Symons | 429/15 |
| 4,072,540 | 2/1978 | Symons et al. | 429/70 |
| 4,115,529 | 9/1978 | Behling | 423/472 |
| 4,146,680 | 3/1979 | Carr et al. | 429/51 |
| 4,306,000 | 12/1981 | Kodali | 429/51 |
| 4,385,099 | 5/1983 | Fong et al. | 429/15 |
| 4,386,140 | 5/1983 | Bjorkman, Jr. | 429/19 |
| 4,389,468 | 6/1983 | Bjorkman, Jr. | 429/70 |
| 4,400,446 | 8/1983 | Hacha | 429/19 |
| 4,414,292 | 11/1983 | Kiwalle et al. | 429/19 |
| 4,415,847 | 11/1983 | Galloway | 320/2 |

FOREIGN PATENT DOCUMENTS

| | | | |
|---|---|---|---|
| 0133782 | 8/1983 | Japan | 429/24 |
| 0018577 | 1/1984 | Japan | 429/24 |

OTHER PUBLICATIONS

Development of the Zinc-Chloride Battery for Utility Applications, Section 32, Hydrate-Former Heat Exchanger Development.
Ser. No. 475,184 filed 3/14/83, Bjorkman.

Primary Examiner—Anthony Skapars
Attorney, Agent, or Firm—Harness, Dickey & Pierce

[57] ABSTRACT

Temperature control mechanism takes the form of discrete electronic circuit or programmed digital computer for accurately regulating the temperature of a hydrate forming solution in a metal halogen battery during charge. The electronic circuit and/or digital computer senses the actual solution temperature, by measuring the temperature of coolant circuit in thermal communication therewith. The actual temperature is compared with a set point temperature based on curve fitting algorithm for approximating the hydrate formation temperature which changes during charge. For sufficiently large differences between actual and set point temperatures, an electrical impulse is applied to servo driven mixing value to selectively increase or decrease flow of chilled coolant to the coolant circuit.

27 Claims, 6 Drawing Figures

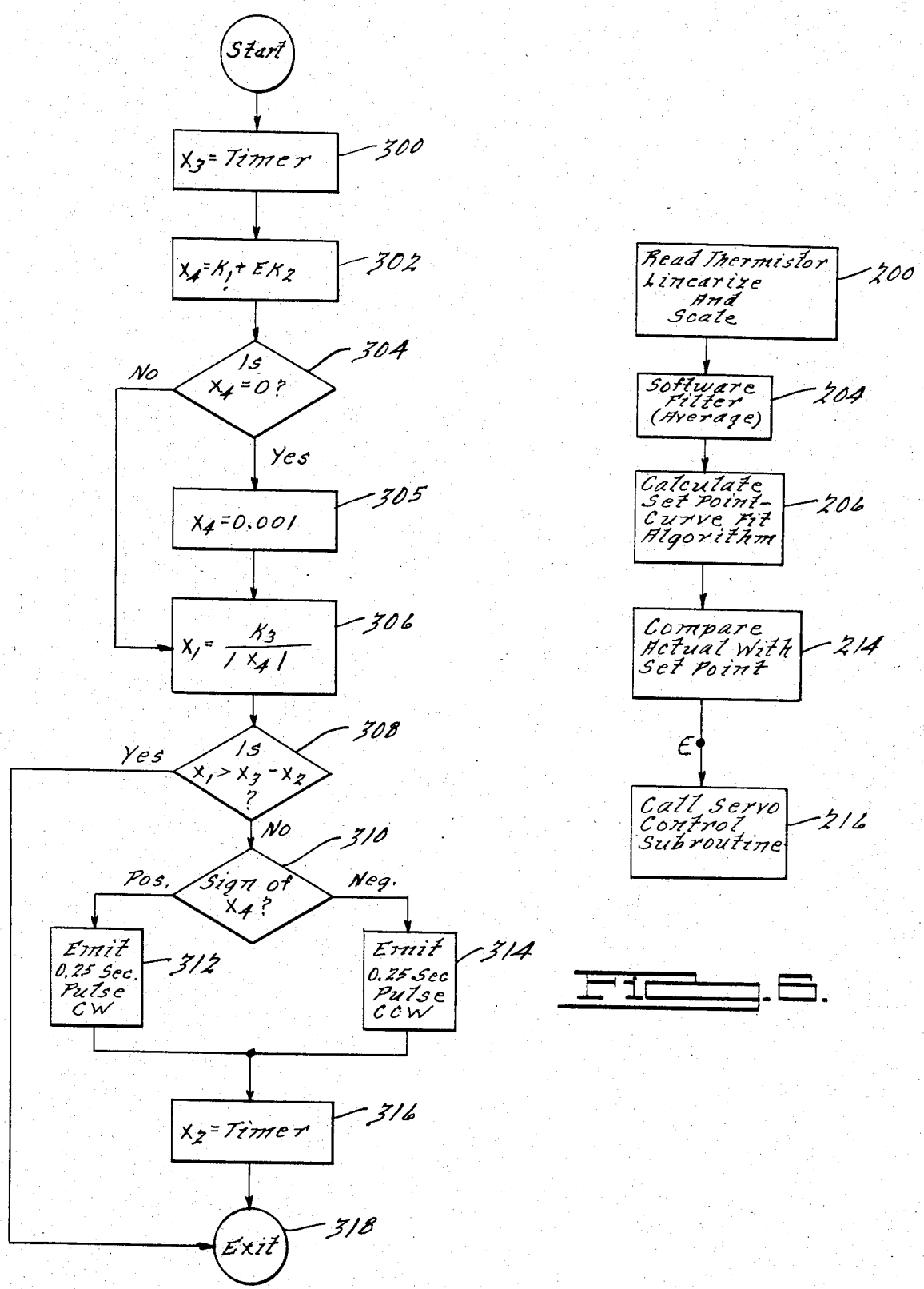

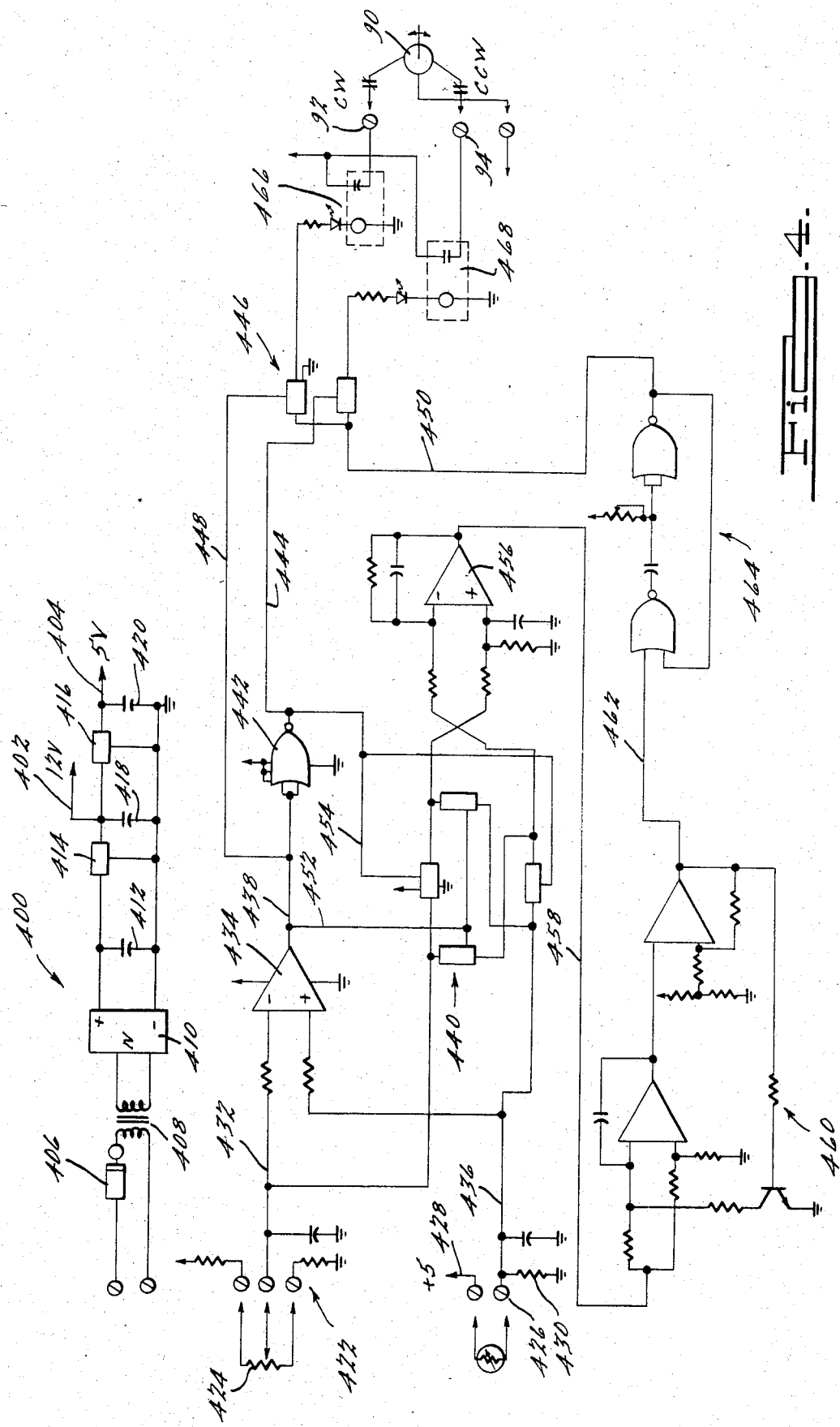

METHOD AND APPARATUS FOR REGULATING THE HYDRATE FORMATION TEMPERATURE IN A METAL-HALOGEN BATTERY

BACKGROUND OF THE INVENTION

1. Field of the Invention

The present invention broadly relates to improved electrical energy storage systems, more particularly to metal halogen battery systems. More specifically, the invention relates to a method of and apparatus for dynamically maintaining the hydrate formation temperature within a hydrate forming solution during charge.

2. Description of the Prior Art

The electrical energy storage systems of the type referred to herein, (e.g., a zinc-chlorine battery) utilize a halogen hydrate as a source of halogen component for reduction at a normally positive electrode, and an oxidizable metal adapted to become oxidized at a normally negative electrode during the normal discharge of the storage system. An aqueous electrolyte is employed for replenishing the supply of the halogen component as it becomes reduced at the positive electrode. The electrolyte contains the dissolved ions of the oxidized metal and the reduced halogen, and is circulated between the electrode area and a storage area containing halogen hydrate, which progressively decomposes during a normal discharge of the electrical energy system liberating additional elemental halogen to be consumed at the positive electrode. Electrical energy storage systems or battery systems of this type are described in prior patents owned by the same assignee as the present invention, such as U.S. Pat. No. 3,713,888, U.S. Pat. No. 3,993,502, U.S. Pat. No. 4,001,036, and U.S. Pat. No. 4,146,680. Such systems are also described in U.S. patents owned by the assignee of the present invention, such as U.S. Pat. No. 4,413,042, issued Nov. 1, 1983, entitled Inert Gas Rejection System for Metal Halogen Batteries, and U.S. Pat. No. 4,400,446, issued Aug. 23, 1983, and entitled Halogen Hydrate Storage Device for Mobile Zinc-Chloride Battery Systems, U.S. Pat. No. 4,415,847, issued Nov. 15, 1983, entitled Method and Apparatus for Supplying Cooling Liquid to a Storage Battery.

The basic operation of a metal halogen battery, such as an aqueous zinc-chloride battery system with graphite and/or other stable electrode substrates is as follows. In charge, an electrolyte pump delivers aqueous electrolyte to pockets between pairs of porous graphite-chlorine electrodes in a battery stack comprised of a plurality of cells. The electrolyte passes through the porous chlorine electrodes into a chamber between opposite polarity electrodes, flows up between the electrodes, then flows back into the battery sump. Chlorine gas liberated from porous graphite electrode substrates is pumped by a gas pump, and before entering the gas pump, the chlorine is mixed with electrolyte chilled by a chiller unit. The chlorine and chilled electrolyte are mixed in the gas pump, chlorine hydrate forms, and the chlorine hydrate-electrolyte mixture is deposited in the store. In discharge, chlorine is liberated from hydrate by decomposition of chlorine hydrate in the store by injection of warm electrolyte from the sump. On development of the required chlorine gas pressure in the store, the chlorine is injected and mixed with and dissolved in the electrolyte, which is then fed into the porous electrodes in the battery stack. The battery stack is then discharged, wherein the electrode dissolution of zinc occurs at the zinc electrode, reduction of the dissolved chlorine occurs at the chlorine electrode, power is available from the battery terminals, and zinc chloride formed in the electrolyte by reaction of zinc and chlorine to form zinc chloride.

During charge, in order for the hydrate to form properly, the temperature within the electrolyte must be closely controlled within tolerances on the order of a few tenths of a degree centigrade. A problem with presently available chiller units is that they have proven generally deficient in providing closely controlled temperatures. Thus it is an object of the present invention to provide a method and apparatus for controlling the hydrate formation tempterature during charge, and a further object to provide very precise temperature control of the hydrate forming electrolyte. Another object is to provide a method and apparatus for controlling the hydrate formation temperature during charge which utilizes servo control based on rate control, thereby allowing implementation using comparatively inexpensive bi-directional AC servo motors and the like.

These and other objects and advantages of the invention will become apparent from the subsequent description and the appended claims taken in conjunction with the accompanying drawings. It is also to be understood that the invention herein is applicable to numerous different constructional arrangements of metal halogen battery systems.

SUMMARY OF THE INVENTION

The method of the present invention comprises controlling the temperature within a metal-halogen battery of the type having a supply of hydrate forming solution or electrolyte; a first coolant circuit for exchanging heat with the solution or electrolyte; and a chiller for removing heat from the coolant circuit. In accordance with the invention the chiller includes a refrigeration means and second coolant circuit for transferring heat to the refrigeration means, and a proportional mixing valve for coupling the first and second cooling circuits. The method comprises determining the temperature of the electrolyte solution, preferably by measuring the temperature withing the first coolant circuit at or near the point where heat is exchanged between the coolant circuit and the electrolyte solution. A set point temperature is determined based on the temperature of the solution in accordance with the curve fitting algorithm which approximates the hydration formation temperature as a function of charge stored in the battery. The set point temperature may also be based on the hydrate concentration within the electrolyte solution which is generally proportional to the charge. The set point temperature and actual temperature of the solution are compared to produce an error value having a magnitude representative of the absolute difference between actual temperature and set point temperature, and further having a sign indicative of whether the set point temperature is above or below the actual temperature. Electrical impulses are produced at time intervals which vary in accordance with the magnitude of the error value. Preferably the electrical impulses maintain a substantially constant pulse width or on time duration, but vary in pulse to pulse occurrence in proportion with the error value. The proportional mixing valve is controlled in accordance with the electrical impulses whereby the valve is caused to selectively increase or decrease coupling between the first and second cooland circuits depending on the sign or polarity of the error value. The mixing valve is adjusted, either to increase or decrease the degree of mixing between the first and second coolants, each time an electrical impulse occurs. For example, an error value having a first sense of polarity might cause the mixing valve to incrementally increase the degree of mixing with each successive impulse, while an error value of the other sense of polarity would cause the mixing valve to decrease the degree of mixing. If the error is below a determined amount, no electrical impulse is produced and accordingly no mixing valve adjustment is made.

The apparatus for implementing the above-described method, in a first embodiment, comprises a digital computer programmed to perform the above steps as will be more fully discussed below. A second embodiment, discussed below, implements the method utilizing discrete components, integrated circuits and combinational logic components.

Other objects, features, and advantages of the present invention will become apparent from the subsequent description and the appended claims, taken in conjunction with the accompanying drawings, in which:

BRIEF DESCRIPTION OF THE DRAWINGS

FIG. 3 is a flow chart diagram depicting the logical sequence of steps for controlling the mixing valve servo in accordance with the present invention;

FIG. 4 is a schematic diagram illustrating one presently preferred embodiment of the present invention;

FIG. 6 is a flow charge diagram depicting the logical sequence of steps 4 generating an error in accordance with the present invention.

DESCRIPTION OF THE PREFERRED EMBODIMENTS

Figure 1:
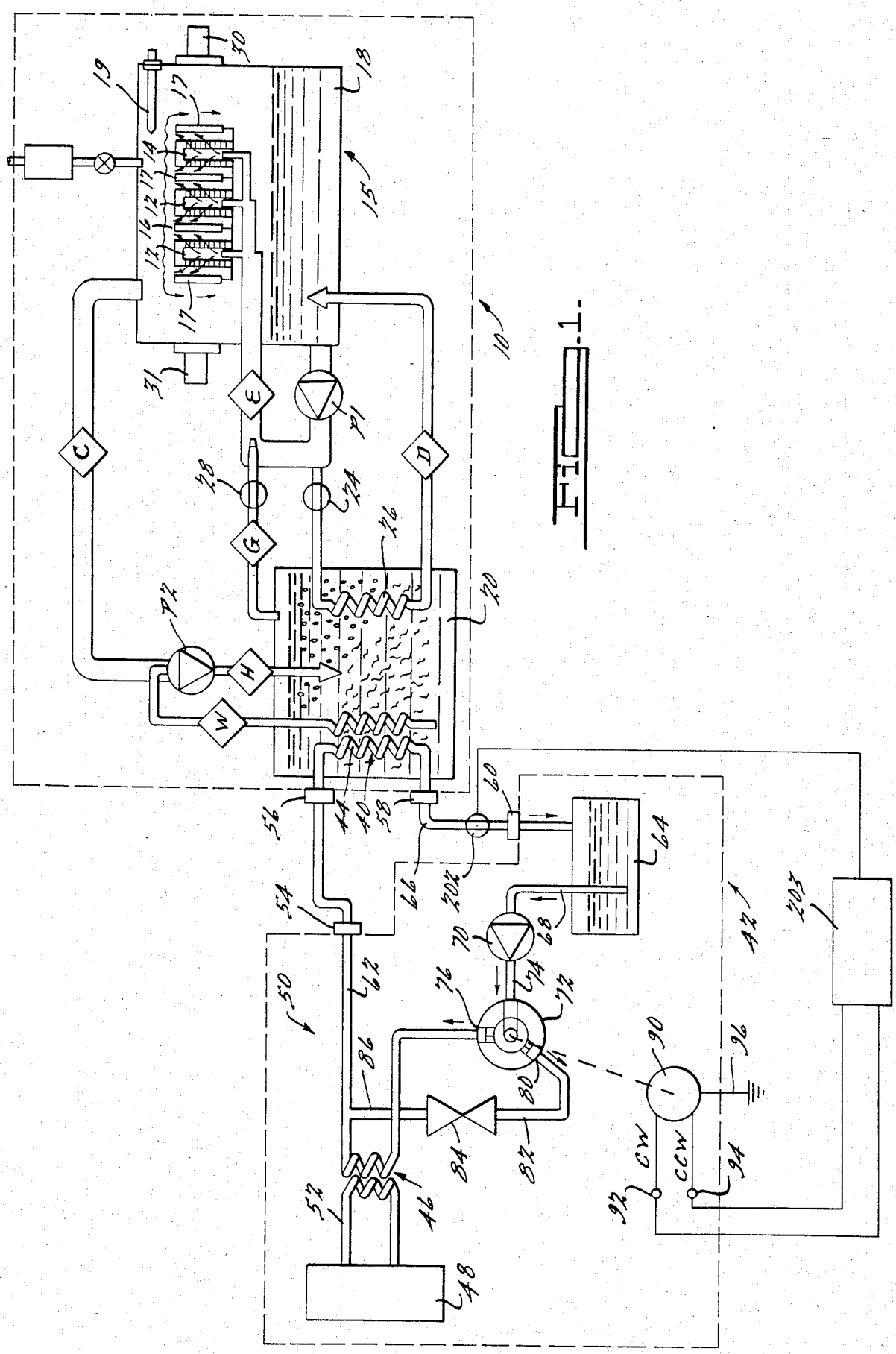
FIG. 1 is a schematic diagram illustrating a typical metal halogen battery system in conjunction with the present invention.

FIG. 1 illustrates one embodiment of a zinc chlorine battery system in connection with which the present invention may be used. The battery system is designated 10 and means are provided to achieve the desired flows of chlorine, electrolyte, water and heat, with a general description thereof now following.

In charge, pump P1 deliver electrolyte to pockets 12 between pairs of porous graphite chlorine electrodes 14 in the battery stack 15. The electrolyte passes through the porous chlorine electrodes 14 into the chamber 16 between the zinc electrode 17 and chlorine electrodes 14, flows up between the electrodes and eventually spills through high resistance cascades back into the sump 18. Chlorine gas is pumped by pump P2 through line C. Before entering pump P2, the chlorine gas is mixed with chilled electrolyte which passes through line W and comes from the bottom of the store 20. The chlorine and chilled electrolyte are mixed in gas pump P2, chlorine hydrate forms, and the chlorine hydrate-electrolyte mixture is deposited in the store 20 through line H. The electrolyte in line W is chilled by passage through a heat exchanger 40. Glycol cooled by means of a chiller unit 42 is circulated through line 44 of heat exchanger 40.

In discharge, the valve 24 in line D is open, permitting a stream of warm electrolyte to pass through a heat exchanger 26 in the store. Chlorine is formed by decomposition of chlorine hydrate in the store 20. On development of the required pressure in the store, the valve 28 in line G is opened and the chlorine passes into line E on the higher pressure side of the electrolyte pump P1. The chlorine dissolves in the electrolyte which is then fed to the porous graphite chlorine electrodes 14. The battery stack 15 can now be discharged, wherein electrode dissolution of the zinc occurs at the zinc electrode 17, reduction of the dissolved chlorine occurs at the chlorine electrode 14, power is available at the battery terminals 30 and 31, and zinc chloride is formed in the electrolyte by reaction of zinc and chlorine to form zinc chloride.

It is to be understood that the foregoing constitutes a description of a typical metal halogen battery system in connection with which the invention may be practiced. As such, the above description is not to be viewed as a limitation of the invention as set forth in the appended claims. Similarly, the chiller unit 42, to be discussed more fully below, is exemplary of a typical chiller unit useable in practicing the invention in its presently preferred embodiments. Modifications in the chiller unit may be made, or other chiller units may be substituted therefore without departing from the scope of the appended claims.

Chiller unit 42 includes heat exchanger 46 coupled to refrigeration unit 48 for removing heat from glycol cooling circuit 50. Refrigeration unit 48 may comprise a commercially available refrigerator or heat pump circulating a coolant such as freon through line 52 of heat exchanger 46. Glycol cooling circuit 50 is in turn coupled through line 44 of heat exchanger 40, by means of quick disconnect fittings or couplings 54, 56, 58 and 60. More particularly, glycol coolant circuit 50 includes line 62 coupled between heat exchanger 46 and heat exchanger 44 via couplings 54 and 56. Circuit 50 further includes reservoir 64 disposed within circuit 50 to receive coolant from heat exchanger 44 via coupling 58, line 66, and coupling 60. Glycol coolant is removed from reservoir 64 through line 68 by means of pump 70, which in turn feeds coolant to proportional mixing valve 72 through line 74. Proportional mixing valve 72 may be implemented using a servo motor controlled rotary valve of the type disclosed in copending patent application Ser. No. 291,030, referenced above, and entitled Liquid Cooling System and Proportional Valve for the Same. Mixing valve 72 includes a first outlet port 76 coupled through line 78 to heat exchanger 46, and a second output port 80 coupled through line 82, shut off valve 84 and line 86 into line 62, by means of a T fitting for example. Mixing valve 72 is actuated by means of servo motor 90 to direct the flow of coolant in variable proportions through heat exchanger 46 and/or through line 82 bypassing heat exchanger 46. By adjusting the relative proportions of coolant circulated through heat exchanger 46 versus coolant bypassing heat exchanger 46, heat can be extracted from the coolant in circuit 50 by refrigeration unit 48 in controlled amounts. By virtue of this proportional mixing arrangement, the heat capacity of the entire quantity of circulating fluid serves to sustain or hold its temperature relatively constant. Bypassing a proportion of this coolant through heat exchanger 46 for heat removal thereby effects controlled temperature adjustments without upsetting the general temperature equilibrium of the coolant circuit as a whole.

In accordance with the present invention servo motor 90 includes a first terminal 92 for driving in a clockwise direction and a second terminal 94 for driving in a counter clockwise direction. Servo motor 90 further includes ground terminal 96 which in conjunction with either terminal 92 or terminal 94 is used to energize motor 90. In the presently preferred embodiment servo motor 90 may be a commercially available bidirectional AC motor, which has the advantage of being relatively inexpensive. In general, however, other suitable motors may be used without departing from the spirit of the invention. Motor 90 may be coupled through the appropriate gearing (not shown) for more precise control of mixing valve 72. In addition, mixing valve 72 may include positive stops to prevent rotation beyond predetermined limits, typically 90° in either direction.

During charge, the electrolyte of zinc chloride solution forms a hydrate within store 20. To promote the formation of such hydrate the temperature within the electrolyte solution must be maintained at the hydration formation temperature (nominally $-3°+3°$ C.) preferably within 1/10th of a degree centrigrade of such temperature. If the temperature is permitted to rise much above the hydration formation temperature, hydration formation will be considerably diminished and the performance of the battery is significantly impaired. On the other hand, if the temperature is permitted to drop much below the hydration formation temperature, the system will freeze up and impair the battery's operation.

Figure 2:
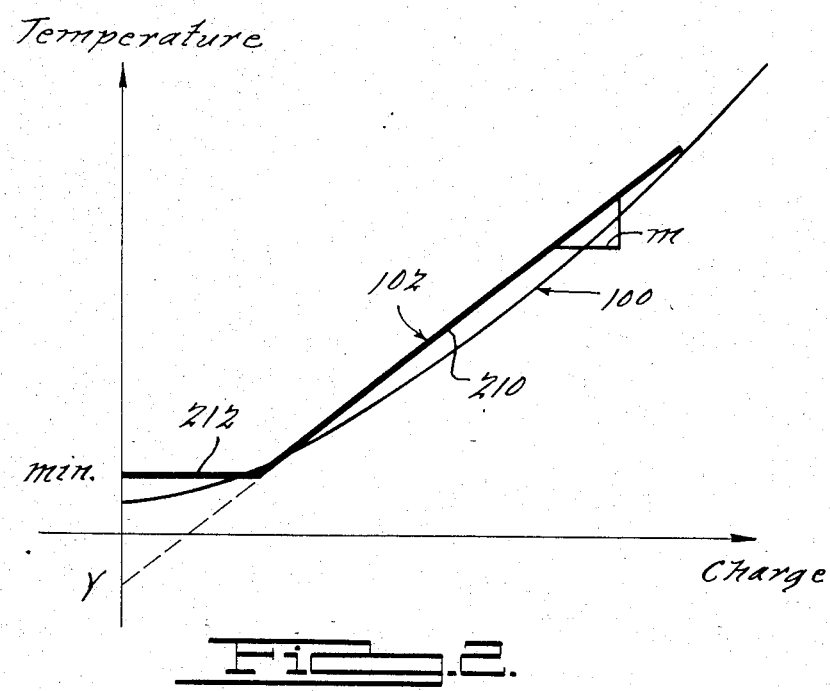
FIG. 2 is a graph depicting the relationship between halogen formation temperature and charge useful in describing the curve fitting algorithm of the present invention.

To further complicate the problem of maintaining the solution at the hydration formation temperature, the hydration formation temperature changes during the charging process. As the charging process progresses and the hydrate accumulates, the concentration of zinc chloride in solution changes, causing the hydration formation temperature to gradually and continually rise. FIG. 2 illustrates this rise in hydration formation temperature, wherein curve 100 represents the hydration formation temperature profile as a function of charge (or hydrate concentration). As will be explained more fully below, piecewise-linear line 102 represents a first order approximation of the hydration formation temperature profile. This piecewise-linear first order approximation may be determined by a curve fitting algorithm described more fully below. It will be understood, however, that higher order approximations or different curve fitting algorithms may be implemented according to the principles disclosed herein.

Referring now to the flow chart diagrams of FIGS. 3 and 6 the method according to the present invention will now be discussed. Beginning first with FIG. 6 block 200 depicts the step of sensing or measuring the temperature within the glycol cooling circuit. Since the glycol cooling circuit is in thermal communication with the hydrate forming electrolyte through heat exchanger 40, this temperature follows quite closely the actual temperature of the electrolyte and may thus be used for feedback control purposes. In practice the temperature sensing step of block 200 involves reading the voltage drop across or current flow through thermistor 202, which is disposed in thermal communication with line 66 as shown in FIG. 1. The thermistor reading is then linearized and scaled according to the BASIC program in steps 1240 through 1280 set forth in the appendix. To eliminate spurious readings and noise the scaled thermistor reading is passed through software filter 204 which averages a predetermined number of readings to produce a filter temperature indication. Next, the set point temperature or desired temperature is calculated or generated using a curve fitting algorithm such as the algorithm illustrated in FIG. 2. This step is depicted in FIG. 6 by block 206, and is accomplished in accordance with the BASIC program subroutine lines 29100 through 29190 set forth in the appendix. For convenience, the variables used to implement the BASIC program set forth in the appendix comprise a plurality of subscripted variables contained in an array. Referring to lines 29100 through 29190 of the BASIC program, line 29110 will be seen as an equation for the upwardly sloping portion of piecewise-linear line 102. This segment, which is denoted by reference numeral 210 may be described using the general equation for a straight line, namely $Y=MX+B$. Accordingly, in line 29110 of the program variable X9 corresponds to the Y value of the straight line equation, S(26) corresponds to slope M, R1(8) corresponds to X and S(27) corresponds to B, the Y intercept. According to the curve fitting algorithm if the computed value X9 is below a certain limit S(25) then the computed value X9 is set equal to the reference value S(25). In FIG. 2 this minimum reference value is denoted as "MIN" and the line segment 212 is generated when this minimum value is not exceeded.

Having now measured an actual temperature and also having computed a desired temperature or set point temperature, these two temperatures are compared in step 214 to produce an error or difference value. Control of the method then branches according to block 216 to a servo control subroutine which selectively actuates servo motor 90 in either a clockwise or counterclockwise direction in accordance with the error value. The servo control subroutine is illustrated in FIG. 3.

Figure 5:
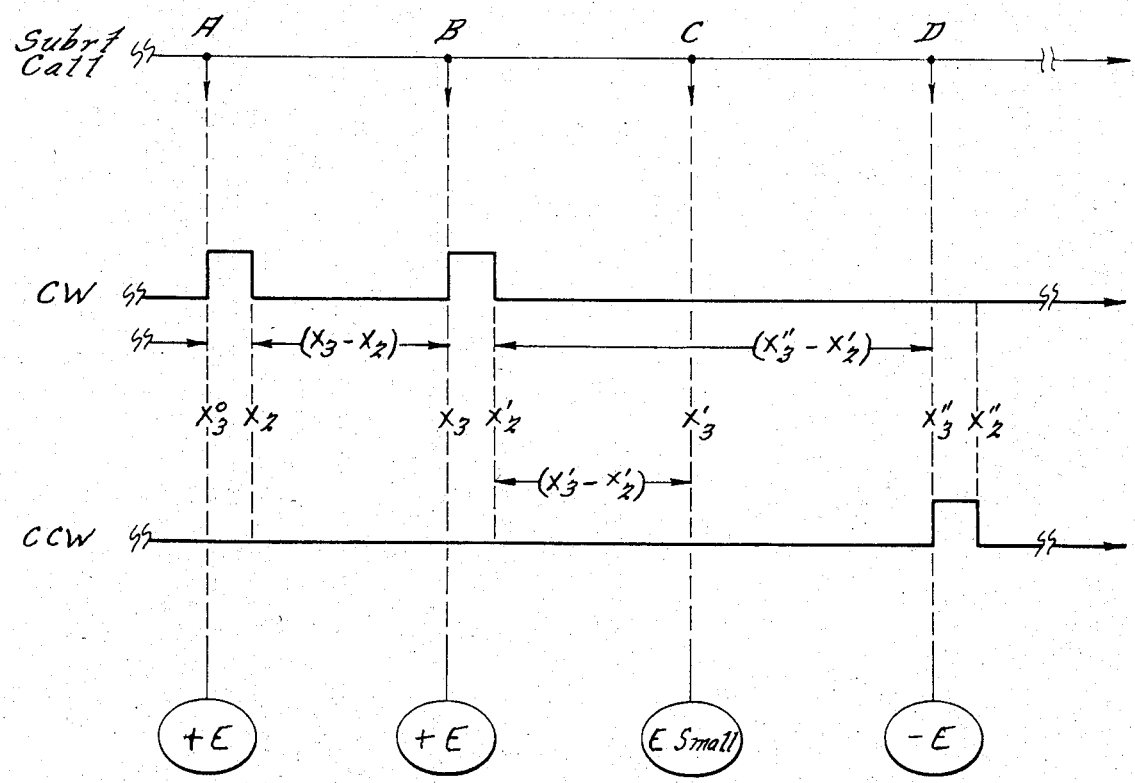
FIG. 5 is an exemplary wave form diagram useful in describing the operation of the invention.

With reference to FIG. 3 and the timing diagrams of FIG. 5, control of servo motor 90 proceeds as follows. Beginning with step 300 variable $X_3$ is set equal to a timer variable which measures elapsed time. In practice it is often convenient to utilize a real time clock to provide the timer signals. In FIG. 5 the timing sequence is illustrated using a first line entitled SUBRT CALL which marks, by means of a downwardly directed arrow, each time the servo control subroutine is called. Preferably the subroutine is called at a periodically constant rate. In FIG. 5 the dotted lines labeled $X_3$ (irrespective of superscripts) mark when $X_3$ is set equal to the timer. Later in the description it will be explained that another variable $X_2$ is also set equal to the timer. These two variables behave somewhat like a stopwatch, wherein $X_2$ marks the turning on of the stopwatch and $X_3$ marks the turning off of the stopwatch. Thus the difference $X_3-X_2$ is an elapsed time measurement. Although the flow chart of FIG. 3 and the timing diagram of FIG. 5 fully illustrate the servo control portion of the present invention, reference may also be had to lines 29200 through 29290 of the BASIC program set forth in the appendix, which may be used to implement the servo control mechanism. In step 302 variable $X_4$ is computed as a function of error, error having previously been computed by the steps set forth in FIG. 6. $X_4$ represents an intermediate value which is used in step 306 to compute $X_1$ the desired time period between servo control impulses. Since the variable $X_1$ is inversely proportional to variable $X_4$, steps 304 and 305 are provided to assure that the computation will not attempt to divide by zero should $X_4$ equal zero. Of the steps discussed thus far, step 300 corresponds to line 29210 of the BASIC program in the appendix, while lines 302, 304, 305 and 306 correspond to lines 29215 and 29220 of the BASIC program. Next step 308 tests to determine whether the elapsed time measured by the stopwatch variables $X_3-X_2$ is less than the desired or calculated time between pulses $X_1$. It will be noted for small error the calculated time variable $X_1$ is generally large, resulting in the program branching to the exit point 318. This corresponds to the test performed by line 29230 of the BASIC program and branching to line 29270. If, on the other hand, the error is large program control branches to block 310. A large error indicates generally that the actual temperature and desired temperature are sufficiently far apart that corrective measures must be taken by the servo motor 90 which controls mixing valve 72. Step 310 determines whether the error value is positive or negative in sign or polarity. In other words, step 310 determines whether the servo motor 90 must be actuated in a clockwise or a counterclockwise direction. It will be understood that one sense of rotation causes a greater quantity of chilled glycol coolant to be mixed with and circulated through coolant circuit 50, while the other sense of rotation reduces the amount of chilled glycol mixed into the system. If the sign of error value is positive control branches to 312 whereupon a burst or impulse of electrical energy is emitted to the clockwise terminal 92 of servo motor 90. If the sign of the error value is negative, an impulse is output to the counterclockwise terminal 94 of servo motor 90. Lines 29240 and 29250 correspond to these two possibilities. After either a clockwise or counterclockwise pulse has been emitted, step 316 sets stopwatch variable $X_2$ equal to the present timer value. It should be noted that the $X_2$ variable is reset to the present timer value only if control proceeded through blocks 310, and 312 or 314. If, on the other hand, the test performed in block 308 determine that the error was not sufficiently large to emit a servo control pulse, control branches around the stopwatch block 316 and thus stopwatch variable $X_2$ would remain at the value to which it had, at some previous time, been set. With reference to FIG. 5 four successive exemplary subroutine calls are illustrated, denoted by letters A, B, C and D. It is be understood that the specific sequence illustrated in FIG. 5 is exemplary and for illustrative purposes only and is not to be construed as a limitation of the scope of the present invention. In the example shown in FIG. 5 the first subroutine call A is presumed to have occurred based on events occurring prior in time, thus subroutine call A is used herein as a means of setting up exemplary conditions for the next successive subroutine call B. In subroutine call A it is presumed that an impulse was an output on line CW and thus no impulse was output on line CCW. After the impulse is emitted stopwatch variable $X_2$ is set to the present timer value. Some time later at subroutine call B stopwatch variable $X_3$ is set to the present timer value. This timer value is of course different from the previously set stopwatch variable $X_2$ since a certain amount of time has elapsed between the end of subroutine call A and the beginning of subroutine call B. The elapsed time is X3-X2. Next, according to the algorithm of FIG. 3 the error is determined in both magnitude and sign. For purposes of this example it will be assumed that a positive error is computed and that this error is greater than the elapsed time $X_3-X_2$. Accordingly a pulse is emitted on the CW line and stopwatch variable $X_2'$ is reset to the current timer value. At subroutine call C it is assumed for purposes of example that the error is smaller than the new elapsed time $X_3'-X_2'$. Thus no pulse is emitted and $X_2'$ is not updated. At subroutine call D it is assumed that the error is greater in magnitude than the new elapsed time $X_3''-X_2'$ and is negative in sign. Thus a pulse is emitted on the CCW line.

It will be understood that the foregoing description has adopted a convention whereby positive error values produce clockwise servo motion while negative error values produce the opposite motion. This is not to be viewed as a limitation of the invention, the opposite convention being equally possible.

The above described method may be implemented using a digital computer, denoted generally by reference numeral 203 in FIG. 1, which has been programmed to execute the steps set forth in the flow charts of FIGS. 3 and 6. In some applications the computer may take the form of a control computer such as the MACSYM 2 by Analog Devices. In general, a wide variety of computers may be used to implement the invention, including microprocessor based computers. Moreover, while the presently preferred computer embodiment implements the above described algorithms using a computer program or programs written in BASIC, it will be understood that the algorithms may be implemented using other computer languages without departing from the scope of the invention. The computer may include analog input output ports for interfacing with the thermistor temperature sensor and also includes input output modules for interfacing with the servo motor. In practice these interface modules may be included as part of the control computer, or they may be outboard input output devices. Those skilled in the art will recognize that a wide variety of analog to digital converters are available for interfacing a thermistor to a digital computer, and also that digitally controlled switches are commercially available to switch 110 A.C. line current to the servo in response to digital control signals from a computer. The presently preferred digitally controlled switch or relay includes optical isolation to protect the computer from possible damage by the high voltage line current.

A second presently preferred embodiment is illustrated in FIG. 4. This embodiment utilizes commercially available discrete components, integrated circuits and combinational logic and may be used to implement the method of the invention at an economical cost in a minimum amount of space. In FIG. 1, the block given reference numeral 203 shows how this second embodiment is positioned in the circuit.

Referring to FIG. 4 the discrete circuit embodiment comprises power supply 400 for delivering power at two different voltages to the control circuit of the invention. In practice the power supply delivers current through lead 402 at a 12 volt D.C. potential and current through lead 404 at a 5 volt D.C. potential. It will be understood that these voltages are nominal voltages selected in accordance with the power supply requirements of the components which make up the control circuit. Specifically, power supply 400 includes in line fuse 406 through which line A.C. current is supplied to transformer 408. These secondary of transformer 408 is connected to bridge rectifier 410 which is in turn coupled across filter capacitor 412. A pair of voltage regulators 414 and 416 are coupled in series with the positive terminal of bridge rectifier 410. Each voltage regulator includes an output filter capacitor 418 and 420, respectively. Voltage regulator 414 delivers nominally 12 volts D.C. and may be implemented using a 7812 integrated circuit. Voltage regulator 416 delivers nominally 5 volts D.C. and may be implemented using a 7805 integrated circuit.

The control circuit of the presently preferred discrete component embodiment includes a first set of input terminals 422 for coupling to a device capable of providing an indication of the desired set point temperature, as was discussed above. In FIG. 4 this device is illustrated as a potentiometer 424 which may be manually set to give an indication of the desired set point temperature. Potentiometer 424 may be manually or automatically reset during the battery charge cycle so that the set point temperature follows or approximates the set point profile curve 100 of FIG. 2. In an alternative embodiment potentiometer 424 may be replaced by a specific gravity meter capable of measuring the specific gravity of the hydrate forming electrolyte, thereby providing an accurate indication of the desired set point temperature. In yet another embodiment potentiometer 424 may be replaced by any of a number of commercially available programmable controllers capable of producing a voltage of signal which changes over time in accordance with preset parameters. Such a programmable device may be programmed to implement the curve fitting algorithm illustrated by the piecewise-linear function 102 of FIG. 2, or otherwise approximate the temperature profile curve 100.

The invention further comprises input terminals 426 for coupling to thermistor 202. Terminals 426 provide biasing for the thermistor by coupling to a source of D.C. bias voltage as at 428 and through resistor 430 to ground. A signal representing the desired set point temperature is conveyed via lead 432 to the negative terminal of comparator 434 while a signal representing the measured temperature is conveyed via lead 436 to the positive terminal of comparator 434. The output of comparator 434 on lead 438 represents the different between the measured or actual temperature and the desired set point temperature. In other words, lead 438 conveys a signal representing an error value. This error value has both a magnitude or absolute value and a sign or polarity. The error value is applied to circuit 440 which computes the absolute value or magnitude of the error. The error is also applied to the input of invertor 442 which provides an output signal being the inverse of the error; in other words, when the error signal is positive the output of inverter 442 is negative, and vice versa. The inverted error signal is applied via lead 444 to steering circuit 446. Also applied, via lead 448, to steering circuit 446 is the error signal. The steering circuit receives electrical impulses on lead 50 for controlling the servo motor 90. Steering circuit 446 directs these impulses to either the CW terminal 92 or the CCW terminal 94 in accordance with the sign or polarity of the error value. Steering circuit 446 may be implemented using analog switches such as CD4016 integrated circuits.

Absolute value circuit 440 is also implemented using analog switches such as CD4016 integrated circuits interconnected as shown in FIG. 4. Four such analog switches make up the absolute value circuit 440 which responds to the error signal on lead 452 and its inverse on lead 454 to apply the actual temperature signal from lead 436 and the desired set point temperature from lead 432 to the positive or negative terminals of error amplifier 456. The output of error amplifier 456 provides an error signal proportional to the absolute value or magnitude of the difference between the actual measured temperature and the desired set point temperature. This absolute value signal is applied through lead 458 to a voltage to frequency converter circuit 460. The output of voltage to frequency converter 460 on lead 462 comprises an oscillatory signal whose frequency varies in accordance with the error magnitude signal on lead 458. This variable frequency oscillating signal is applied to a one shot circuit 464 which produces a series of impulses of preferably fixed pulse width, but of varying period between pulses, in accordance with the frequency of the oscillating signal on lead 462. The output of one shot circuit 464 is applied via lead 450 to steering circuit 446 where the impulses produced thereby are directed to either the clockwise or counterclockwise terminals of servo motor 90. Solid state relays 466 and 468 respond to the impulses produced by one shot circuit 464 to provide the necessary step up voltage and/or current needed to drive servo motor 90.

In operation, the circuit thus described in connection with FIG. 4 performs the steps illustrated in FIGS. 3 and 6. This discrete component embodiment performs essentially as illustrated in the timing diagram of FIG. 5.

While it will be apparent that the preferred embodiments of the invention disclosed are well calculated to fulfill the objects above stated, it will be appreciated that the invention is susceptible to modification, variation and change without departing from the proper scope or fair meaning of the invention.

TABLE 1

APPENDIX

```
1240  FOR I'=1 TO 9 @TEMPS
1250    IF A(I'+3, 1)<.2 THEN R2(I')=99.9 GOTO 1280
1260    IF A(I'+3, 1)>4.8 THEN R2(I'(I')=−99.9 GOTO 1280
1270    R2(I')=4007.86/(LOG(A(I'+3, 1)*2.326667/(5.−A(I'+3, 1))) +13.441964−373.16
1280  NEXT I'
9100  @EQUIL GLY T CURVE FIT
9110  X9=S(26)*R1(8)+S(27)
9120  IF X9<S(25) THEN S(21)=S(25)
9125  IF X9>=S(25) THEN S(21)=X9
9130  RETURN
9190  @
9200  @TEMP CNTL SERVO
9210  X3=TIMER
9215  X4=(X6+S(22)*X8) IF X4=0 THEN X4=.001
9220  X1=S(23)/ABS(X4)
9230  IF X3−X2<X1 THEN GOTO 29270
9240  IF SGN(X4)=−1 THEN DOT(2,3)=1 WAIT .25 DOT(2,3)=0
9250  IF SGN(X4)=+1 THEN DOT(2,4)=1 WAIT .25 DOT(2,4)=0
9260  X2=TIMER
```

TABLE 1-continued
APPENDIX

9270 RETURN
9290 @

What is claimed is:

1. A method of controlling the temperature within a metal-halogen battery having a supply of hydrate forming solution; a first coolant circuit for exchanging heat with said solution and means for removing heat from said first coolant circuit including refrigeration means, second coolant circuit for transferring heat to said refrigeration means and proportional mixing valve means for coupling said first and second coolant circuits comprising, determining the temperature of said solution;
determining a set point temperature in accordance with measurements indicative of the hydrate concentration of said solution;
comparing the temperature of said solution with said set point temperature to produce an error value having magnitude and sign;
producing electrical impulses at time intervals varying in accordance with the magnitude of said error value; and
controlling said proportional mixing value means in accordance with said electrical impulses and the sign of said error value, thereby controlling the degree of coupling between said first and second coolant circuits.

2. The method of claim 1 wherein said proportional mixing valve means includes servo motor means and the step of controlling said proportional mixing valve means comprises driving said servo motor means in accordance with said electrical impulses.

3. The method of claim 2 wherein servo motor means is bidirectional having means for driving in a clockwise direction and means for driving in a counter-clockwise direction and wherein the step of controlling said proportional mixing valve means comprises selectively driving said servo motor in a clockwise direction or in a counter-clockwise direction in accordance with the sign of said error value.

4. The method of claim 1 wherein the step of determining the temperature of said solution comprises sensing the temperature of said first coolant circuit.

5. The method of claim 1 wherein the step of determining a set point temperature comprises computing an estimated set point temperature based on said temperature of said solution.

6. The method of claim 1 wherein the step of producing electrical impulses comprises measuring an elapsed time with respect to a preceding electrical impulse;
computing a set point time as a function of said error value;
comparing said set point time with said elapsed time; and
generating an electrical impulse in response to the outcome of comparing said set point time with said elapsed time.

7. The method of claim 6 wherein said set point time is inversely proportional to said error value.

8. The method of claim 6 wherein said set point time is computed by computing an intermediate value as a linear function of said error value; and computing said set point time as an inversely proportional function of said intermediate value.

9. The method of claim 8 further comprising testing said intermediate value and changing said intermediate value by a predetermined increment if said intermediate value equals zero.

10. The method of claim 9 wherein said set point time is inversely proportional to the magnitude of said intermediate value.

11. The method of claim 1 wherein the step of determining the temperature of said solution comprises measuring the temperature within said first coolant circuit at a point in thermal communication with said solution.

12. The method of claim 11 further comprising filtering the measured temperature.

13. An apparatus for controlling the temperature within a metal-halogen battery having a supply of hydrate forming solution; a first coolant circuit for exchanging heat with said solution and means for removing heat from said first coolant circuit including refrigeration means, second coolant circuit for transferring heat to said refrigeration means and proportional mixing value means for coupling said first and second coolant circuits comprising, means for determining the temperature of said solution and producing a temperature signal;
means for producing a set point signal;
comparing means responsive to said temperature signal and said set point signal for producing an error signal having magnitude and sign;
means for producing electrical impulses at time intervals varying in accordance with the magnitude of said error signal; and
control means responsive to the sign of said error signal for coupling said electrical impulses to said mixing value means, thereby controlling the degree of coupling between said first and second coolant circuits.

14. The apparatus of claim 13 wherein said proportional mixing value includes servo motor means for selectively actuating said value towards positions of increased coupling and positions of decreased coupling.

15. The apparatus of claim 13 wherein said means for determining the temperature of said solution comprises thermistor means.

16. The apparatus of claim 15 wherein said thermistor means is disposed in thermal communication with said first coolant circuit.

17. The apparatus of claim 15 wherein said thermistor means is disposed in thermal communication with said hydrate forming solution.

18. The apparatus of claim 13 wherein said means for producing a set point signal comprises digital computer means.

19. The apparatus of claim 13 wherein said means for producing a set point signal comprises means for providing a set point reference signal variable with elapsed time.

20. The apparatus of claim 13 wherein said means for producing a set point signal comprises means for indicating the hydrate concentration of said solution and for providing a set point reference signal in accordance with said hydrate concentration.

21. The apparatus of claim 13 wherein said comparing means comprises amplifier means having inverting and non inverting input means receptive of said temperature signal and said set point signal.

22. The apparatus of claim 13 further comprising absolute value producing means responsive to said temperature signal and said set point signal for producing a magnitude signal representative of the magnitude of said error signal.

23. The apparatus of claim 13 further comprising steering means receptive of said error signal for controlling said mixing value means in accordance with the polarity of said error signal.

24. The apparatus of claim 13 wherein said control means includes oscillating signal producing means responsive to said error signal.

25. The apparatus of claim 24 wherein said oscillating signal producing means includes voltage to frequency converting means.

26. The apparatus of claim 24 wherein said control means further includes pulse generating means responsive to said oscillating signal producing means.

27. The apparatus of claim 26 wherein said pulse generating means comprises one shot means.

* * * * *